(12) United States Patent
Iwasaki

(10) Patent No.: US 8,745,286 B2
(45) Date of Patent: Jun. 3, 2014

(54) TRANSMISSION APPARATUS, RECEPTION APPARATUS, TRANSMISSION METHOD, RECEPTION METHOD, AND PROGRAM

(75) Inventor: Shingo Iwasaki, Fujisawa (JP)

(73) Assignee: Canon Kabushiki Kaisha, Tokyo (JP)

(*) Notice: Subject to any disclaimer, the term of this patent is extended or adjusted under 35 U.S.C. 154(b) by 417 days.

(21) Appl. No.: 12/829,236

(22) Filed: Jul. 1, 2010

(65) Prior Publication Data

US 2011/0009072 A1 Jan. 13, 2011

(30) Foreign Application Priority Data

Jul. 7, 2009 (JP) ................................. 2009-160761

(51) Int. Cl.
| | | |
|---|---|---|
| *G06F 3/00* | (2006.01) | |
| *G06F 13/28* | (2006.01) | |
| *H04B 1/00* | (2006.01) | |
| *H04B 7/00* | (2006.01) | |
| *H04B 1/02* | (2006.01) | |
| *G06F 3/033* | (2013.01) | |

(52) U.S. Cl.
USPC ................... 710/30; 710/11; 455/68; 455/91; 455/130

(58) Field of Classification Search
USPC ....................... 710/5, 11, 30; 455/68, 91, 130
See application file for complete search history.

(56) References Cited

U.S. PATENT DOCUMENTS

| | | | | |
|---|---|---|---|---|
| 5,537,398 | A * | 7/1996 | Siwiak ........................... | 370/204 |
| 5,797,085 | A * | 8/1998 | Beuk et al. ....................... | 455/88 |
| 6,181,707 | B1 * | 1/2001 | Erickson et al. .............. | 370/442 |
| 6,687,260 | B1 * | 2/2004 | Peace ........................... | 370/450 |
| 2001/0009855 | A1 * | 7/2001 | I'Anson ........................ | 455/445 |
| 2005/0187979 | A1 * | 8/2005 | Christensen et al. ......... | 707/200 |
| 2009/0227282 | A1 * | 9/2009 | Miyabayashi et al. ..... | 455/552.1 |

FOREIGN PATENT DOCUMENTS

| | | |
|---|---|---|
| CN | 1184571 A | 6/1998 |
| CN | 1868165 A | 11/2006 |
| JP | 02-253448 A | 10/1990 |
| JP | 03-022159 A | 1/1991 |
| JP | 11-150645 A | 6/1999 |
| JP | 2000-235529 A | 8/2000 |
| JP | 2001-043153 A | 2/2001 |
| JP | 2003-006125 A | 1/2003 |
| JP | 2004-171513 A | 6/2004 |

OTHER PUBLICATIONS

SOAP Message Transmission Optimization Mechanism. W3C, Jan. 25, 2005. Web. <http://www.w3.org/TR/soap12-mtom/>.
SOAP Messages with Attachments. W3C, Dec. 11, 2000. Web. <http://www.w3.org/TR/SOAP-attachments>.

* cited by examiner

*Primary Examiner* — Farley Abad
(74) *Attorney, Agent, or Firm* — Canon U.S.A., Inc. IP Division

(57) ABSTRACT

A transmission apparatus transmits a part of a message by a first protocol and a remainder of the message by a second protocol to the reception side, and further transmits a processing module for receiving the remainder on the reception side by the second protocol, to the reception side by the first protocol. The transmission apparatus controls the transmission of the remainder to transmit the remainder of the message to the reception side by the second protocol in a state where the reception side can perform reception.

24 Claims, 10 Drawing Sheets

TRANSMISSION APPARATUS, RECEPTION APPARATUS, TRANSMISSION METHOD, RECEPTION METHOD, AND PROGRAM

BACKGROUND OF THE INVENTION

1. Field of the Invention

The present invention relates to a transmission apparatus, a reception apparatus, a transmission method, a reception method, and a program.

2. Description of the Related Art

These days, various services are provided via a computer network. Among technologies used for such services, there is a web service related technology. A web service means a system for exchanging data between computers without manual operation, using various communication protocols as represented by a hypertext transfer protocol (HTTP).

In the web service, an SOAP message including an SOAP document, or an SOAP document and attachment data, is transmitted and received between a client and a server. In the web service, using a communication protocol between the client and the server, various computer apparatuses or incorporated apparatuses can receive information via the SOAP message. The HTTP has been generally utilized as the communication protocol used for the web service (e.g., SOAP Messages with Attachments http colon//www dot w3 dot org/TR/SOAP-attachments, or SOAP Message Transmission Optimization Mechanism http colon//www dot w3 dot org/TR/soap12-mtom/).

In equipment including a function of the web service that transmits and receives the SOAP message, a transport performs processing of the communication protocol having a function for flowing a byte stream on the network. Conventionally, a module (hereinafter, referred to as a transport processing module) that performs processing of the transport is generally provided in the equipment in advance. Further, the entire message is generally transmitted and received in one transport statically-selected by a person when a one-time request is made.

However, with the conventional web service, when a partner on the transmission destination does not include the transport processing module which the person wishes to use, the transmission and reception can be performed only in a basic transport (e.g., HTTP) that is generally used on the web service. Therefore, when the transmission and reception are to be executed in another transport, there is a problem that incorporation of a corresponding transport processing module becomes troublesome on the partner side. Communication in a plurality of transports or any of protocols of other layers also has a similar problem, irrespective of the web service.

SUMMARY OF THE INVENTION

The present invention is directed to enable the use of a proper protocol according to a message portion to be transmitted, regardless of whether the reception side includes the protocol.

According to an aspect of the present invention, a transmission apparatus includes a transmission unit that transmits a part of a transmission target message by a first protocol and a remainder of the message by a second protocol to a reception side, and further transmits a processing module for receiving the remainder by the second protocol on the reception side, to the reception side by the first protocol, and control unit that controls the transmission unit to transmit the remainder of the message to the reception side by the second protocol so that the reception side can receive the remainder using the second protocol.

According to another aspect of the present invention, a communication method executed by a transmission apparatus and a reception apparatus includes transmitting a part of a transmission target message by a first protocol and a remainder by a second protocol, from the transmission apparatus to the reception apparatus and further transmitting a processing module which allows the reception apparatus to receive the remainder by the second protocol, from the transmission apparatus to the reception apparatus by the first protocol, and controlling the transmission of the transmission apparatus to transmit the remainder to the reception apparatus by the second protocol in a state where the reception apparatus can receive by the second protocol, wherein the reception apparatus receives the part and the processing module by the first protocol and receives the remainder by the second protocol.

According to yet another aspect of the present invention, a reception apparatus includes a reception unit that receives a message by a first protocol and data by a second protocol, a capturing unit that captures a processing module for receiving the data by the second protocol from the message, and identifying unit that identifies data corresponding to an identifier included in the message.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An apparatus according to the first exemplary embodiment of the present invention includes both functions of transmission and reception of a message. According to the first exemplary embodiment, for convenience's sake, the transmission side is referred to as a client, and the reception side is referred to as a provider. Therefore, it will be assumed that the processing on the transmission side is performed by the client and the processing on the reception side is performed by the provider according to the first exemplary embodiment. However, the present invention is not limited to communication between the server and the client. A message to be transmitted is not limited to an SOAP message.

Figure 1:
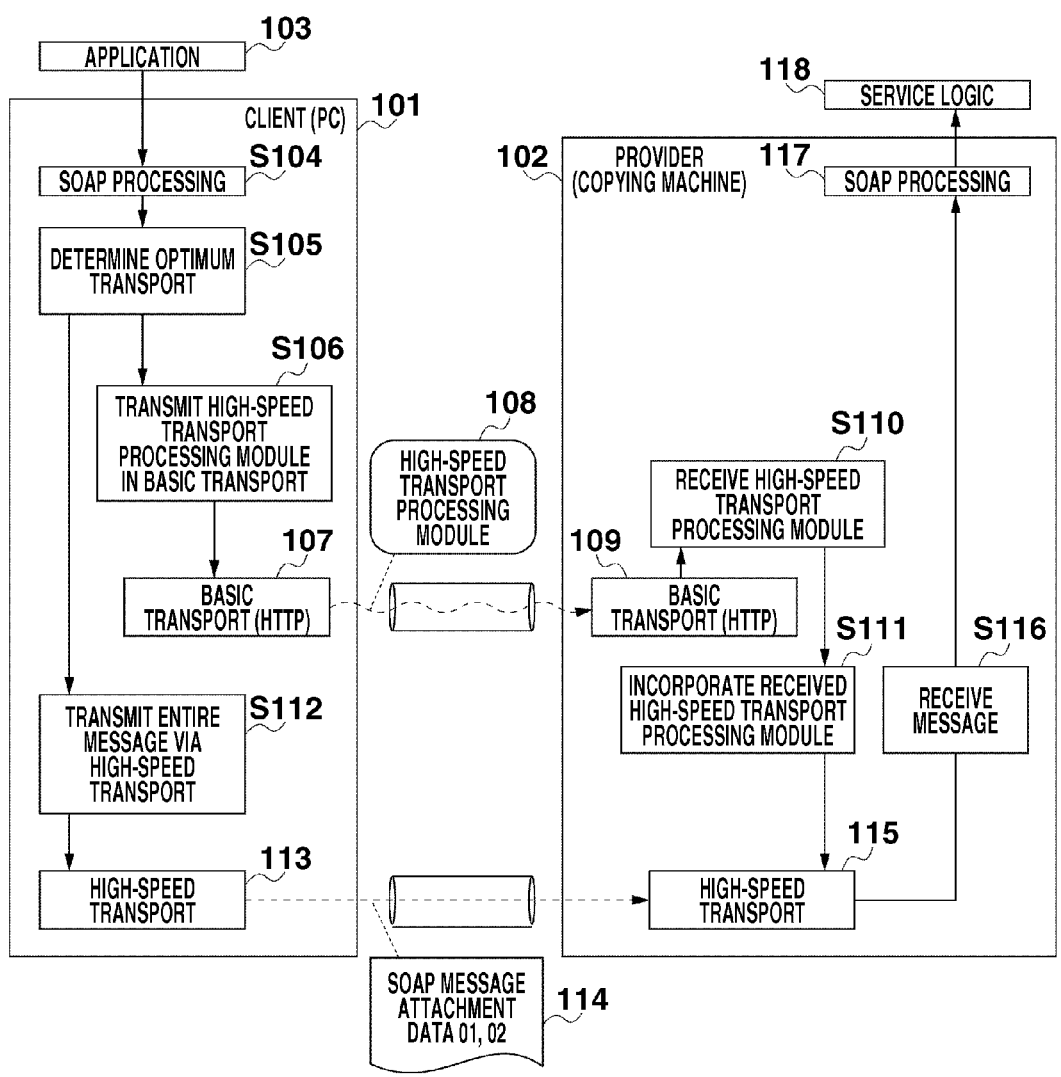
FIG. 1 is a diagram schematically illustrating processing in a message transmission and reception apparatus with transport switching.

First, processing of a message transmission and reception apparatus with transport switching is schematically described according to the first exemplary embodiment with reference to FIG. 1. A client (transmission side) 101 performs transmission processing in the apparatus according to the first exemplary embodiment, and is a personal computer (hereinafter, referred to as a PC) according to the first exemplary embodiment. A provider (reception side) 102 performs reception processing in the apparatus according to the first exemplary embodiment, and is a copying machine according to the first exemplary embodiment. The provider is not limited to the copying machine, and may be a PC, a server, or an incorporated apparatus. Similarly, the client is not limited to the PC.

Processing on the transmission side is first described. An application 103 sends information to be transmitted using a web service to the apparatus (client) 101 according to the first exemplary embodiment. Then, in step S104, the apparatus 101 according to the first exemplary embodiment first performs processing for generating an SOAP message. The application 103 may be disposed within the client 101. Subsequently, in step S105, the client 101 obtains a default value of a volume of one SOAP message previously-registered or sent from the application 103. The default value is compared with a calculated value of the volume of the entire SOAP message thus generated. When the volume of the entire SOAP message is larger than the default value, the client 101 determines that the message is the SOAP message with a large volume, and also determines whether or not there is a transport that can transmit a message with a large volume at high speed.

When it is determined that there is the high speed transport, in step S106, the client 101 performs a first transmission procedure to transmit a processing module 108 that can process the high-speed transport to the side of the provider 102 in a basic transport 107 such as a hypertext transfer protocol (HTTP). Herein, the high-speed transport includes a function that transfers a large volume message in the HTTP at high speed. The volume of the entire SOAP message is increased in many cases when attachment data is added to the message, such as image data or moving image data which shows a large volume. Upon adding the attachment data to an SOAP message to be transmitted, the SOAP message from which the attachment data is removed is also transmitted in the basic transport, and the attachment data is transmitted in the high-speed transport.

In step S110, the provider 102 side performs a first reception procedure to receive a processing module 108 transmitted from the client 101 in the HTTP as the basic transport 109. In step S111, a received processing module 115 is incorporated into the provider 102 to enable the reception of the message in the high-speed transport 115. Further, in step S110, the provider 102 replies to the client 101 side in the HTTP 109 that the reception preparation is completed.

After confirming the completion of preparation for receiving a message in the high-speed transport on the provider 102 side, in step S112, the client 101 performs a second transmission procedure to transmit an SOAP message 114 generated in step S104 in a high-speed transport 113 to the provider 102. Upon adding the attachment data to the SOAP message to be transmitted, the SOAP message from which the attachment data is removed is transmitted in the basic transport 107, and the attachment data is transmitted in the high-speed transport 113. In step S116, the provider 102 side performs a second reception procedure to receive the SOAP message 114 in the high-speed transport 115 incorporated into the provider 102. In step S117, the provider 102 side performs processing for analyzing the SOAP message and transmits the analysis result to a service logic 118. The service logic 118 may be disposed in the provider 102.

While it is determined whether the message is transferred in the high-speed transport as an example according to the first exemplary embodiment, it may be determined whether the transfer is performed in a transport having a different feature, e.g., a transport with higher reliability.

The transport can be dynamically switched in transmitting the message in the apparatus according to the first exemplary embodiment. Therefore, even when the reception side does not include a transport desired by the transmission side, the message can be transmitted and received in the transport.

Figure 2:
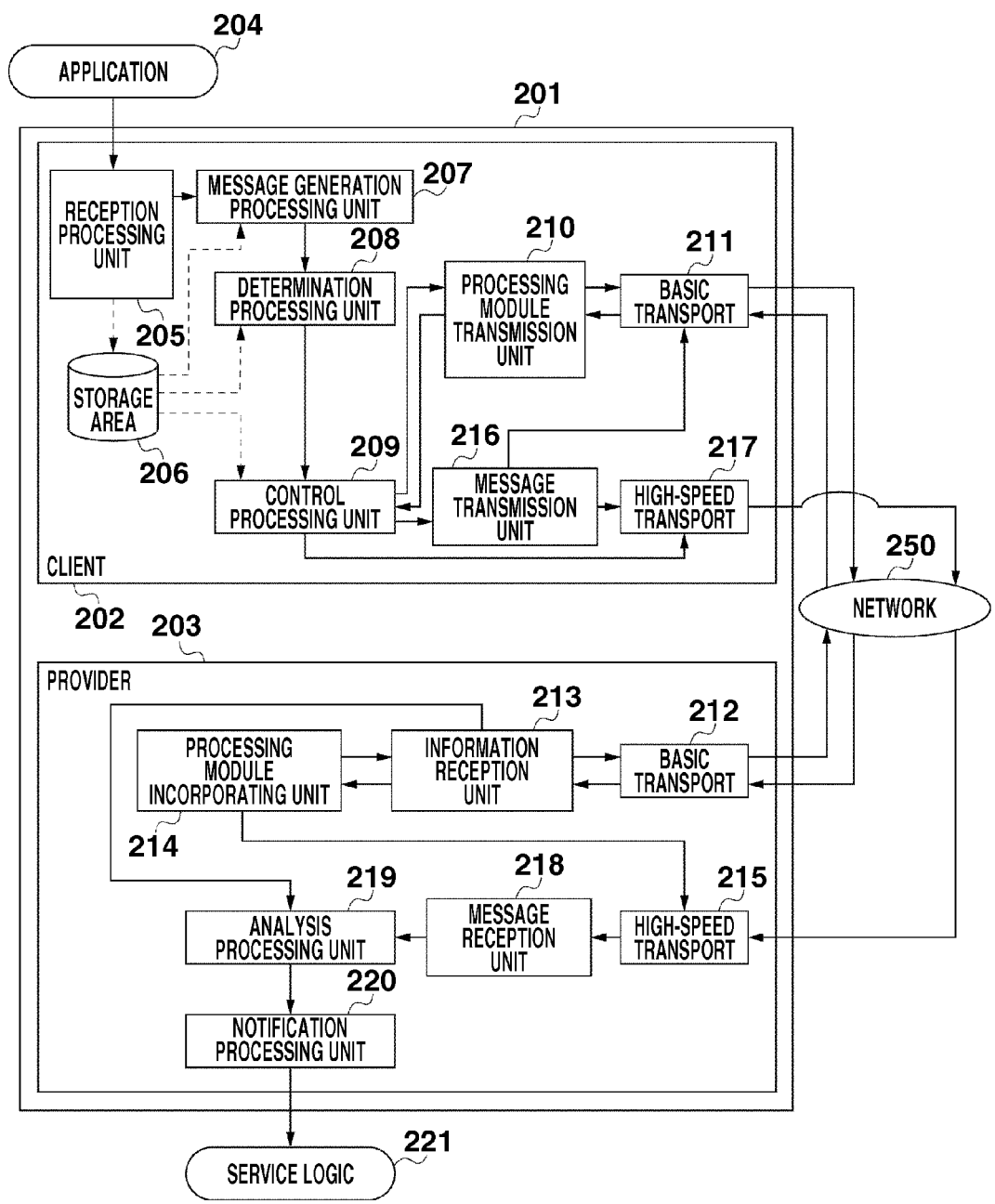
FIG. 2 is a diagram illustrating a processing configuration of an apparatus according to a first exemplary embodiment.

Next, a processing configuration of the apparatus is described according to the first exemplary embodiment. FIG. 2 is a diagram illustrating the processing configuration provided in the client 101 and the provider 102 of the apparatus according to the first exemplary embodiment. An apparatus 201 is an entire configuration according to the first exemplary embodiment. A client 202 has a configuration for transmission processing. A provider 203 has a configuration for reception processing. Referring to FIG. 1, it is assumed that the client 101 and the provider 102 are independent apparatuses. Referring to FIG. 2, a client 202 and a provider 203 are independent apparatuses that are connected via a network 250. Alternatively, one apparatus may include configurations of the client 202 and the provider 203.

A reception processing unit 205 receives information necessary for generating the SOAP message from an application 204, and stores the information in a storage area 206. Subsequently, a message generation processing unit 207 obtains information necessary for generating the SOAP message from the storage area 206, and generates the SOAP message.

Further, a determination processing unit 208 receives, from the storage area 206, a threshold as the basis for decision in selecting the optimum transport for transmitting the SOAP message. According to the first exemplary embodiment, the threshold is set as a default value of the SOAP message volume in determining whether or not the volume of the generated SOAP message is large.

A determination processing unit 208 receives the SOAP message from the message generation processing unit 207. When the volume of the entire SOAP message is larger than the default value, the determination processing unit 208 determines that the SOAP message has a large volume. Then, the determination processing unit 208 determines whether or not there is a high-speed transport that can receive a large volume message at high speed. If there is a high-speed transport, the determination processing unit 208 selects the high-speed transport as the optimum transport. If there is not a high-speed transport, the determination processing unit 208 selects the basic transport as the transport to be used. The storage area 206 stores a processing module that can process the high-speed transport. When the volume of the SOAP message is small, the determination processing unit 208 also selects the basic transport.

A control processing unit 209 checks whether the determination processing unit 208 selects the high-speed transport. When the determination processing unit 208 selects the high-speed transport, the control processing unit 209 issues an instruction for transmitting a processing module which can process the high-speed transport, to a processing module transmission unit 210. In this case, the control processing unit 209 issues the instruction for transmitting a message in a basic transport 211. The processing module transmission unit 210 is first transmission means that transmits information on the side (reception side) of the provider 203 in the basic transport (first transport) 211. According to the first exemplary embodiment, the basic transport 211 is an HTTP that is generally used for transmission and reception of the web service. Upon adding the attachment data to the SOAP message to be transmitted, the SOAP message obtained by removing the attachment data is transmitted in the basic transport 211, and the attachment data is transmitted in the high-speed transport 217. When the determination processing unit 208 does not select the high-speed transport 217, the determination processing unit 208 determines that the entire SOAP message is transmitted in the basic transport 211. Then, the control processing unit 209 issues an instruction for transmitting the entire SOAP message to a message transmission unit 216.

On the side of the provider 203, an information reception unit 213 receives the information transmitted from the side of the client 202 in a basic transport 212. More specifically, the information reception unit 213 is first reception means that receives information from the side (transmission side) of the client 202 in the basic transport (first transport) 212. The information reception unit 213 analyzes whether or not the received information is the SOAP message. If the received information is not the SOAP message, the information reception unit 213 determines that the processing module is incorporated into the information and issues an instruction for incorporating, to a processing module incorporating unit 214. If the received information is the SOAP message, the information reception unit 213 issues an instruction for performing message analysis to an analysis processing unit 219. A method for determining whether the received information is the SOAP message is executed by analyzing, for example, a content-type value and determining whether the value includes a value prescribed based on the SOAP specification. If a value "text/xml" or "application/soap+xml" prescribed based on the SOAP specification is included, the information reception unit 213 determines that the information is the SOAP message. If a value other than those values is included, the information reception unit 213 determines that the information is the processing module.

The processing module incorporating unit 214 that receives the incorporating instruction from the reception processing unit 213 incorporates the received processing module 213 into the provider 203, thereby receiving the information in a high-speed transport 215. After ending the incorporation processing, the processing module incorporating unit 214 returns a notification indicating the end of the incorporation to the client 202 side in the basic transport 212. The processing module 215 has a function that is realized by executing a program using a computer (not shown) of the provider 203. The client 202 transmits the program from the basic transport 211 to the provider 203. Other processing units in the client 202 and the provider 203 may be similarly realized by executing the program.

The processing module transmission unit 210 receives the response of the notification indicating the end of the incorporation from the provider 203 in the basic transport 211, and transmits the received response to the control processing unit 209. After receiving the notification, the control processing unit 209 incorporates, into the client 202, a processing module 217 corresponding to the processing module 215 transmitted to the side of the provider 203. When the processing module 217 is incorporated into the client 202 in advance, the incorporation operation is not required. Herein, it is assumed that the processing module 217 includes a transmission function and a reception function.

The control processing unit 209 issues an instruction for transmitting the SOAP message generated by the message generation processing unit 207 to the message transmission unit 216 in the high-speed transport 217. When adding the attachment data to the SOAP message to be transmitted, the SOAP message obtained by removing the attachment data is transmitted in the basic transport 211, and the attachment data is transmitted in the high-speed transport 217. The message transmission unit 216 is second transmission means that transmits the SOAP message to the side of the provider 203 in the high-speed transport 217. More specifically, the processing module transmission unit 210 transmits the transport processing module for performing reception of the high-speed transport (second transport) 215 to the provider 203 in the basic transport 211. Thereafter, the message transmission unit 216 transmits the information to the provider 203 in the high-speed transport (second transport) 217 that performs reception processing with the transport processing module that is received by the side (reception side) of the provider 203.

On the side of the provider 203, a message reception unit 218 as second reception means receives the SOAP message in the high-speed transport 215. The information reception unit 213 receives the transport processing module that performs the reception processing in the high-speed transport (second transport) 215. The message reception unit 218 receives the information from the side (transmission side) of the client 202 in the high-speed transport (second transport) 215 that performs reception processing with the transport processing module. An analysis processing unit 219 analyzes the received SOAP message, and extracts necessary information. A notification processing unit 220 sends a notification indicating the information extracted by the analysis processing unit 219 to a service logic 221, thereby executing processing of the service on the side of the provider 203.

According to the first exemplary embodiment of the present invention, the processing module incorporating unit 214 deletes the high-speed transport processing module incorporated into the provider 203 after ending the processing for receiving the message.

Figure 3:
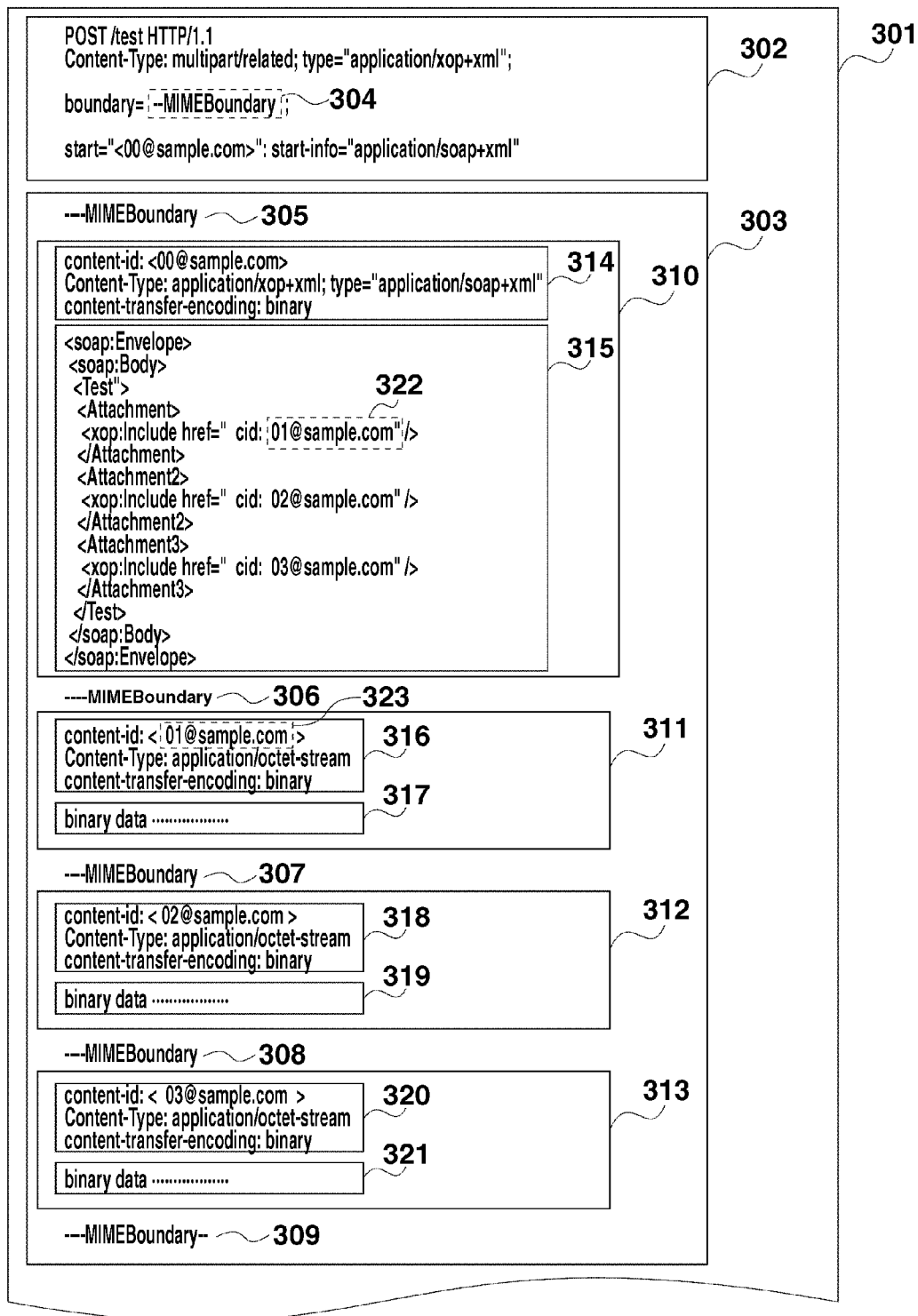
FIG. 3 is a diagram illustrating an example of an SOAP message.

Next, an example is described in which to the SOAP message, the attachment data to be transmitted and received is added in the apparatus according to the first exemplary embodiment. FIG. 3 illustrates a general example of adding the attachment data to the SOAP message transmitted from the client 202 to the provider 203. An SOAP message 301 is an example of the entire SOAP message with the attachment data, and is configured based on a message transmission optimization mechanism (MTOM) specification. The SOAP message 301 includes a protocol binding header 302 and an MIME multi-part type message 303. Referring to FIG. 3, the HTTP is illustrated as an example of a protocol. The protocol binding header 302 has header information based on the HTTP specification such as content-type or content-length.

A boundary value is set to a boundary 304 to partition the MIME multi-part type message 303 into parts. The value of the boundary 304 is set to portions 305 to 309 that are individually partitioned into parts 310 to 313. The part 310 includes a header 314 and a body 315. The body 315 includes an SOAP document. The parts 311 to 313 respectively include headers 316, 318, and 320 and bodies 317, 319, and 321, and the bodies 317, 319, and 321 include the entity of binary data as the attachment data. As illustrated by a portion 322, a content-id ID can be set in the body 315 as the SOAP document, as reference information of the attachment data. As illustrated by a portion 323, a content-id set to each part can be referred to from the ID.

Upon adding the attachment data to the SOAP message to be transmitted, the protocol binding header 302 and the part 310 are transmitted in the basic transport, and the parts 311 to 313 are transmitted in the high-speed transport.

Figure 4:
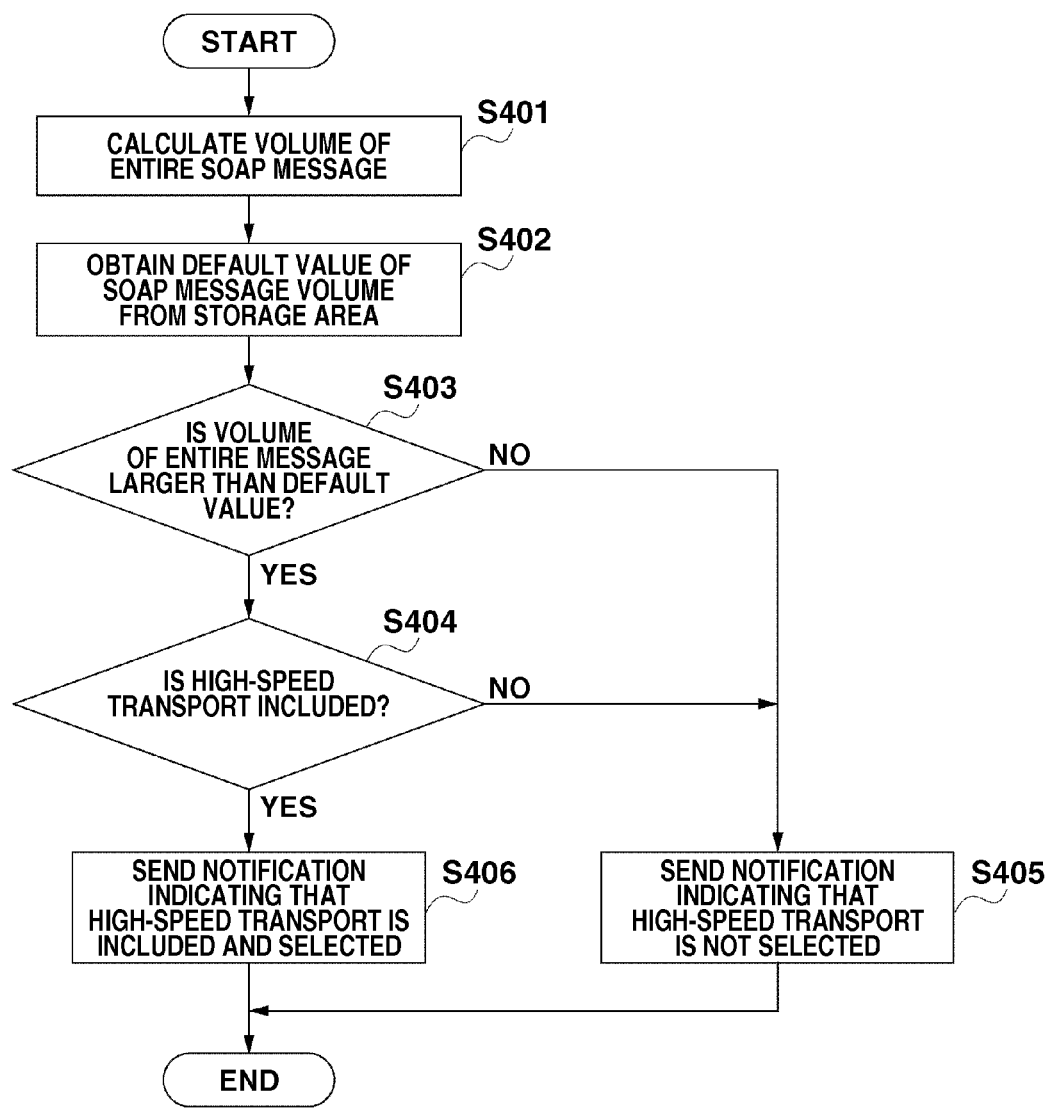
FIG. 4 is a flowchart illustrating a specific processing flow of a determination processing unit.

FIG. 4 is a flowchart illustrating a specific processing flow of the determination processing unit 208. In step S401, the determination processing unit 208 calculates the volume of the entire SOAP message received from the message generation processing unit 207. In step S402, the determination processing unit 208 obtains the threshold set by the application 204 from the storage area 206. The threshold is a default value of the volume of a criteria SOAP message as a reference value used when determining whether the volume of the SOAP message is large. In step S403, the determination processing unit 208 determines whether the volume of the entire SOAP message is larger than the default value as the threshold. When it is determined that the volume of the entire SOAP message is larger than the default value, the determination processing unit 208 shifts the processing to step S404. When it is determined that the volume of the entire SOAP message is smaller than or is identical to the default value, the determination processing unit 208 shifts the processing to step S405.

The SOAP message includes a large volume data. Thus, in step S404, the determination processing unit 208 checks to see if the storage area 206 includes a high-speed transport for transferring information of a large volume at high speed. Further, when the storage area 206 includes a high-speed transport, the determination processing unit 208 shifts the processing to step S406. When the storage area 206 does not include a high-speed transport, the determination processing unit 208 shifts the processing to step S405. In step S405, the determination processing unit 208 sends to the control processing unit 209 a notification indicating that the storage area 206 does not include a high-speed transport and the high-speed transport is not therefore selected. In step S406, the determination processing unit 208 sends to the control processing unit 209 a notification indicating that the storage area 206 includes a high-speed transport and the high-speed transport is therefore selected.

According to the first exemplary embodiment, as an example, the transfer in the high-speed transport is determined. Alternatively, it may be determined whether the transfer is performed in a transport with a different feature, e.g., a transport with higher reliability.

Figure 5:
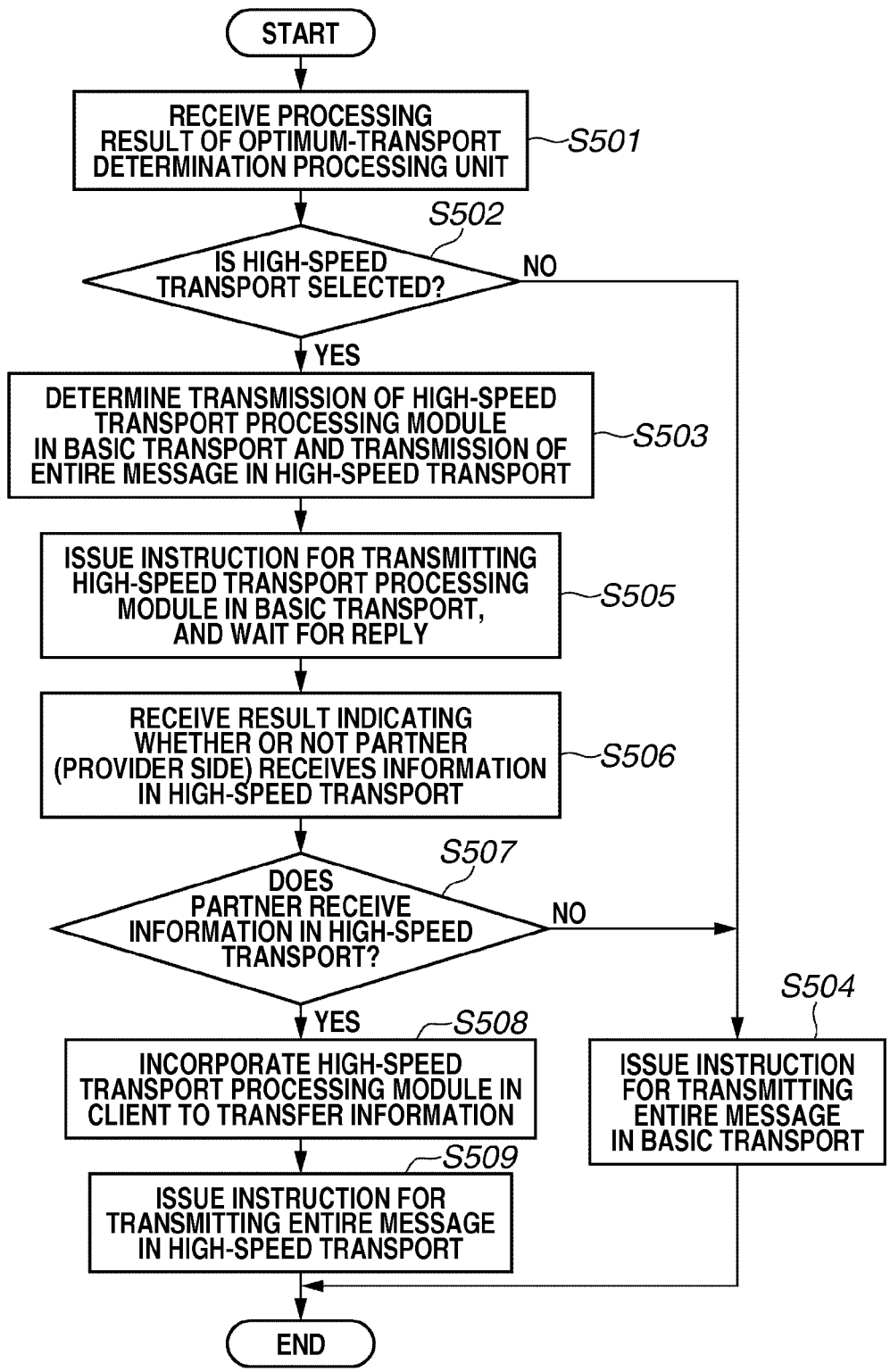
FIG. 5 is a flowchart illustrating a specific processing flow of a control processing unit.

FIG. 5 is a flowchart illustrating a specific processing flow of the control processing unit 209. In step S501, the control processing unit 209 receives the processing result of the determination processing unit 208. In step S502, the control processing unit 209 determines whether the high-speed transport is selected for transmission of the message. When the high-speed transport is selected, the control processing unit 209 shifts the processing to step S503. When the high-speed transport is not selected, the control processing unit 209 shifts the processing to step S504 whereupon the control processing unit 209 issues to the message transmission unit 216 an instruction for transmitting the entire message in the basic transport.

In step S503, the control processing unit 209 determines the transmission of the selected processing module in the basic transport 211 and the transmission of the entire message in the high-speed transport 217. When the attachment data is added to the SOAP message to be transmitted, the control processing unit 209 transmits the SOAP message obtained by removing the attachment data, in the basic transport 211, and also transmits the attachment data in the high-speed transport 217. In step S505, the control processing unit 209 issues an instruction for transmitting the processing module to the processing module transmission unit 210 in the basic transport 211, and waits for a response. When the attachment data is added to the SOAP message to be transmitted, the control processing unit 209 transmits the SOAP message obtained by removing the attachment data, in the basic transport 211. In step S506, the control processing unit 209 receives in the basic transport 211 a result indicating whether the partner (e.g., the side of the provider 203) that transmits the processing module receives the information in the high-speed transport 215.

In step S507, the control processing unit 209 determines whether the partner receives the information in the high-speed transport 215. When the control processing unit 209 determines that the partner receives the information in the high-speed transport 215, the control processing unit 209 shifts the processing to step S508. When the control processing unit 209 determines that the partner does not receive the information in the high-speed transport 215, the control processing unit 209 shifts the processing to step S504. When the client 202 side can determine whether the provider 203 side includes the high-speed transport 215, if it is determined that the provider side 203 does not have the high-speed transport 215, the control processing unit 209 transmits the high-speed transport processing module to the provider 203 side.

In step S508, the control processing unit 209 determines whether the high-speed transport 217 is incorporated into the client 202 corresponding to the high-speed transport 215 transmitted to the provider 203. When the high-speed transport 217 is not incorporated in the client 202, then the high-speed transport 217 is incorporated into the client 202 to transfer the information. In step S509, the control processing unit 209 issues an instruction for transmitting the entire message to the message transmission unit 216 in the incorporated high-speed transport 217. When the attachment data is added to the SOAP message to be transmitted, the control processing unit 209 transmits the SOAP message obtained by removing the attachment data in the basic transport, and further transmits the attachment data in the high-speed transport 217.

Next, the second exemplary embodiment according to the present invention is described. According to the second exemplary embodiment, the message and the attachment data included in the message are transmitted in different transports. The processing is schematically described with reference to FIG. 6.

A client 601 performs transmission in an apparatus according to the second exemplary embodiment, and is a personal computer (hereinafter, referred to as a PC) in the second exemplary embodiment. A provider 602 performs reception processing in the apparatus according to the second exemplary embodiment, and is a copying machine in the second exemplary embodiment.

First, the processing on the transmission side is described. An application 603 transmits information to be transmitted in the web service, to the apparatus (client) 601 according to the second exemplary embodiment. Then, the client 601 performs processing for generating the SOAP message in step S604. In step S605, the client 601 obtains a default value of a volume of the SOAP message. Then, the client 601 compares the default value with a value obtained by calculating the volume of the entire generated SOAP message. When the volume of the entire SOAP message is larger than the default value, the client 601 determines whether there is a high-speed transport that can transmit information of a large volume at high speed. The processing is similar to the processing according to the first exemplary embodiment described above with reference to FIG. 1.

When the client 601 determines that there is a high-speed transport, in step S606, an attachment data portion is deleted from an SOAP message 607 generated in step S604, and the SOAP message to which the high-speed transport processing module is added is regenerated. The regenerated SOAP message 607 is transmitted to the provider 602 side in a basic transport 608 such as an HTTP. Herein, the high-speed transport includes a function for transferring information of a large volume in the HTTP at high speed.

The provider 602 side receives the SOAP message 607 transmitted from the client 601 in an HTTP as a basic transport 609 in step S610. Then, the provider 602 side analyzes the received SOAP message and further analyzes whether the transport processing module is attached. When the transport processing module is attached, in step S611, the module is incorporated into the provider 602 to receive the information in the high-speed transport. The provider 602 side sends a reply to the client 601 side that the reception is prepared, in the HTTP in step S610.

After confirming that the reception is prepared in the high-speed transport 615 on the side of the provider 602, in S612, the attachment data 614 of the portion in the SOAP message 607 which is deleted in step S606 is transmitted to the provider 602 in a high-speed transport 613. The side of the provider 602 receives the attachment data 614 in a high-speed transport 615 incorporated into the provider 602 in step S616, performs analysis processing of information about the SOAP document and the attachment data in step S617, and transmits the analysis result to a service logic 618.

According to the second exemplary embodiment, it is determined as an example whether the transfer is performed in the high-speed transport. Alternatively, it may be determined whether the transfer is performed in a transport with a different feature, such as a transport with higher reliability.

The SOAP document and the attachment data included in the SOAP message can be transmitted in different transports by dynamically switching the transports in the apparatus according to the second exemplary embodiment as described above.

Figure 7:
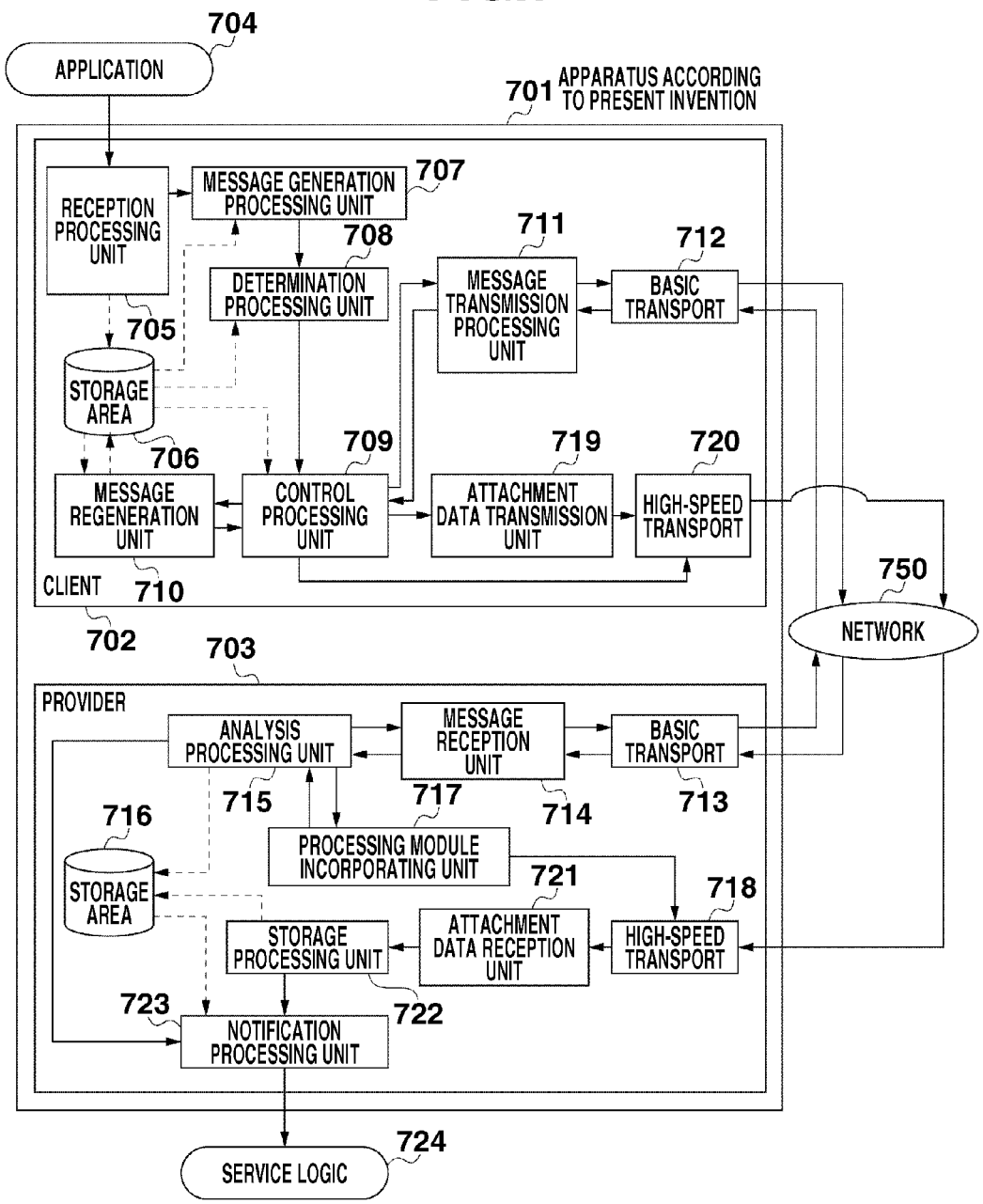
FIG. 7 is a diagram illustrating a processing configuration of an apparatus according to a second exemplary embodiment.

Next, a processing configuration of the apparatus according to the second exemplary embodiment is described. FIG. 7 is a diagram illustrating a processing configuration of the apparatus according to the second exemplary embodiment provided in the client 601 and the provider 602. An apparatus 701 is the entire configuration according to the second exemplary embodiment. A client 702 has a processing configuration for transmission. A provider 703 has a configuration for reception processing.

A reception processing unit 705 receives information necessary for generating an SOAP message from an application 704, and stores the information in a storage area 706. A message generation unit 707 obtains the information necessary for generating the SOAP message from the storage area 706, and generates the SOAP message. A determination processing unit 708 receives a threshold as the basis for decision in selecting an optimum transport to transmit the SOAP message from the storage area 706.

The determination processing unit 708 receives the SOAP message from the message generation unit 707. When the volume of the entire SOAP message is larger than a default value, the determination processing unit 708 determines whether there is a high-speed transport that can optimally transmit large volume information. When there is a high-speed transport, the determination processing unit 708 selects the high-speed transport. When there is not a high-speed transport, the determination processing unit 708 selects the basic transport as the transport. The storage area 706 stores a processing module for processing the high-speed transport. When the volume of the SOAP message is small, the determination processing unit 708 also selects the basic transport.

A control processing unit 709 checks whether the determination processing unit 708 selects the high-speed transport. When the determination processing unit 708 selects the high-speed transport, a message regeneration unit 710 regenerates the message. More specifically, the message regeneration unit 710 deletes an attachment data portion from the SOAP message generated by the message generation unit 707, and regenerates the SOAP message to which the high-speed transport processing module is added. The control processing unit 709 issues an instruction for transmitting the SOAP message regenerated by the message regeneration unit 710 to a message transmission unit 711. In this case, the control processing unit 709 issues the instruction for transmission in the basic transport 712. The message transmission unit 711 transmits the information to the side (reception side) of the provider 703 in the basic transport (first transport) 712.

When the information including the attachment data is transmitted to the side of the provider 703, the message transmission unit 711 transmits information obtained by removing the attachment data from the information to be transmitted to the side of the provider 703 and the high-speed transport processing module. The message transmission unit 711 transmits the information and the module in the basic transport 712. The basic transport 712 is an HTTP according to the second exemplary embodiment.

Further, on the side of the provider 703, a message reception unit 714 receives the SOAP message transmitted in the basic transport 713 from the side of the client 702, via a network 750. More specifically, the message reception unit 714 receives the information from the side (transmission side) of the client 702 in the basic transport (first transport) 713. An analysis processing unit 715 analyzes the SOAP message received by the message reception unit 714, and stores the analysis result to the storage area 716 in the provider 703. The analysis processing unit 715 also analyzes whether the transport processing module is added. When the transport processing module is added, the analysis processing unit 715 issues an instruction for incorporation, to an incorporating unit 717. When the transport processing module is not added, the analysis processing unit 715 issues to a notification processing unit 723 an instruction for notifying the information about the SOAP message to a service logic 724.

The incorporating unit 717 incorporates the transport processing module into the provider 703 to receive the information in the high-speed transport 718. After ending the incorporation, the incorporation processing unit 717 returns a notification indicating the end of incorporation, to the side of the client 702 in the basic transport 713. A computer (not shown) of the provider 703 executes a program, thereby realizing a function of the processing module 718. The client 702 transmits to the provider 703 the message to which the program is added in the basic transport 712. Other processing units in the client 702 and the provider 703 may be modules realized by executing the program in a similar fashion.

The message transmission unit 711 receives the response notifying the end of incorporation from the side of the provider 703, and transmits the response to the control processing unit 709. After receiving the notification, the control processing unit 709 incorporates, in the client 702, a high-speed transport 720 corresponding to the processing module 718 transmitted to the side of the provider 703. When the high-speed transport 720 is incorporated into the client 702 in advance, the incorporation operation is not required here. The control processing unit 709 instructs the attachment data transmission unit 719 to transmit the attachment data separated by the message regeneration unit 710, in the high-speed transport 720. The attachment data reception unit 719 transmits the attachment data to the side of the provider 703 in the high-speed transport 720.

More specifically, the control processing unit 709 allows the message transmission unit 711 to transmit the transport processing module for receiving the high-speed transport (second transport) 720. After the transmission, the attachment data transmission unit 719 transmits the information to the side of the provider 703 in the high-speed transport 720. In the high-speed transport 720, the transport processing module received by the side (reception side) of the provider 703 performs reception processing. More specifically, when the information including the attachment data is transmitted to the reception side, the attachment data transmission unit 719 transmits the attachment data to the side (reception side) of the provider 703 in the high-speed transport (second transport) 720. The reception side performs reception processing with the transport processing module.

On the provider side 703, an attachment data reception unit 721 receives the attachment data in the high-speed transport 718. More specifically, the message reception unit 714 receives the transport processing module for reception processing in the high-speed transport 718. Then, the message reception unit 714 receives the information from the side (transmission side) of the client 702 in the high-speed transport 718 which performs reception processing with the transport processing module. A storage processing unit 722 stores the attachment data in the storage area 716 of the provider 703, and notifies the storage portion to the notification processing unit 723.

The notification processing unit 723 obtains, from the storage area 716 of the provider 703, information obtained by analyzing the SOAP document from the information on the SOAP message with the analysis processing unit 715 and the information about the attachment data stored in the storage processing unit 722. Further, the notification processing unit 723 identifies the stored attachment data and the SOAP message to which the attachment data is added, by using reference information about the attachment data included in the SOAP message. Furthermore, the notification processing unit 723 performs processing for notifying the information about the attachment data related to contents of the SOAP message to the service logic 724, and sends a notification indicating the processing result to the service logic 724, thereby executing service processing on the side of the provider 703.

The determination processing unit 708 may select the transport according to the type of data, e.g., according to whether the attachment data is a still image or a moving image, and may determine the transmission in the selected transport.

According to the second exemplary embodiment, after performing the processing with the service logic (application) on the reception side, the incorporation processing unit 717 deletes the processing module 718 incorporated into the provider 703.

A specific processing flow of the determination processing unit 708 is similar to FIG. 4.

Figure 8:
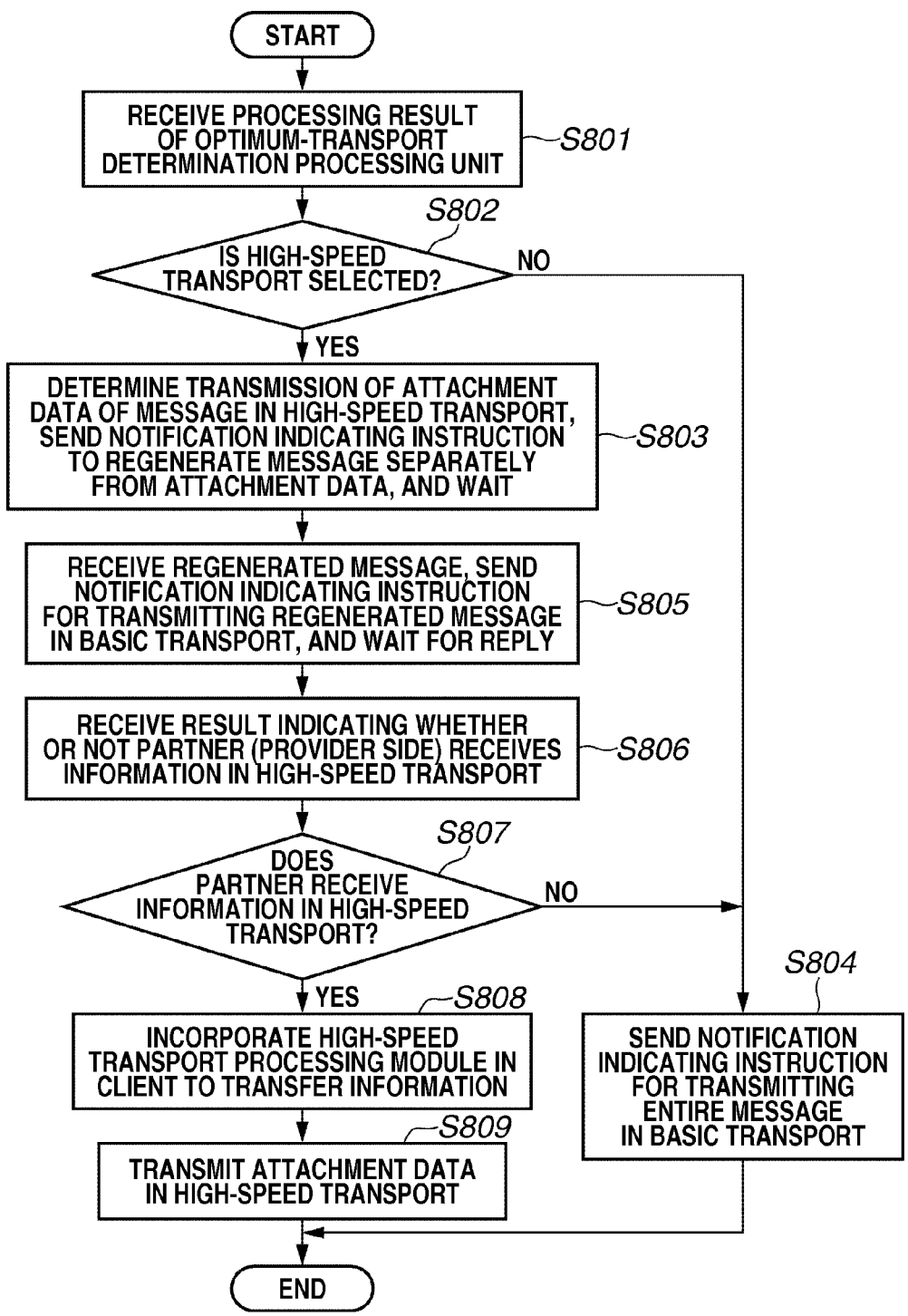
FIG. 8 is a flowchart illustrating a specific processing flow of another control processing unit.

FIG. 8 is a flowchart illustrating a specific processing flow of the control processing unit 709. In step S801, the control processing unit 709 receives the processing result of the determination processing unit 708. In step S802, it is determined whether the high-speed transport is selected for transmission of the message. When the high-speed transport is selected, the control processing unit 709 shifts the processing to step S803. When the high-speed transport is not selected, the control processing unit 709 shifts the processing to step S804.

In step S803, the control processing unit 709 determines to transmit the attachment data added to the message in the selected high-speed transport. Further, the control processing unit 709 separates the attachment data, issues to the message regeneration unit 710 an instruction for regenerating the message to which the high-speed transport processing module is added, and waits for the processing result. In step S805, the control processing unit 709 receives the regenerated message, issues an instruction for transmitting the message in the basic transport 712 to the message transmission unit 711, and waits for a response. In step S806, the control processing unit 709 receives a result indicating whether the partner (e.g., side of the provider 703) to which the message is transmitted with the high-speed transport processing module, receives the information in the high-speed transport 718.

In step S807, the control processing unit 709 determines whether the partner receives the information in the high-speed transport. When the control processing unit 709 determines that the partner receives the information in the high-speed transport, the control processing unit 709 shifts the processing to step S808. When the control processing unit 709 determines that the partner does not receive the information in the high-speed transport, the control processing unit 709 shifts the processing to step S804.

In step S808, the control processing unit 709 determines whether the client 702 incorporates the high-speed transport 720 corresponding to the processing module 718 transmitted to the provider 703 into the client 702. The storage area 706, for example, stores the processing module for processing the high-speed transport. When the processing module 720 is not incorporated into the client 702, the client 702 incorporates the processing module thereinto transfer the information. In step S809, the control processing unit 709 issues, to the attachment data transmission unit 719, an instruction for transmitting the attachment data added to the message via the incorporated high-speed transport processing module.

When the processing shifts to step S804, the control processing unit 709 determines to transmit the entire message including the attachment data in the basic transport 713, and issues an instruction for transmitting the entire message to the message transmission unit 711.

According to the second exemplary embodiment, it is determined as an example whether the transfer is performed in the high-speed transport. Alternatively, it may be determined whether the transfer is performed in a transport with a different feature, e.g., a transport with higher reliability.

Figure 9:
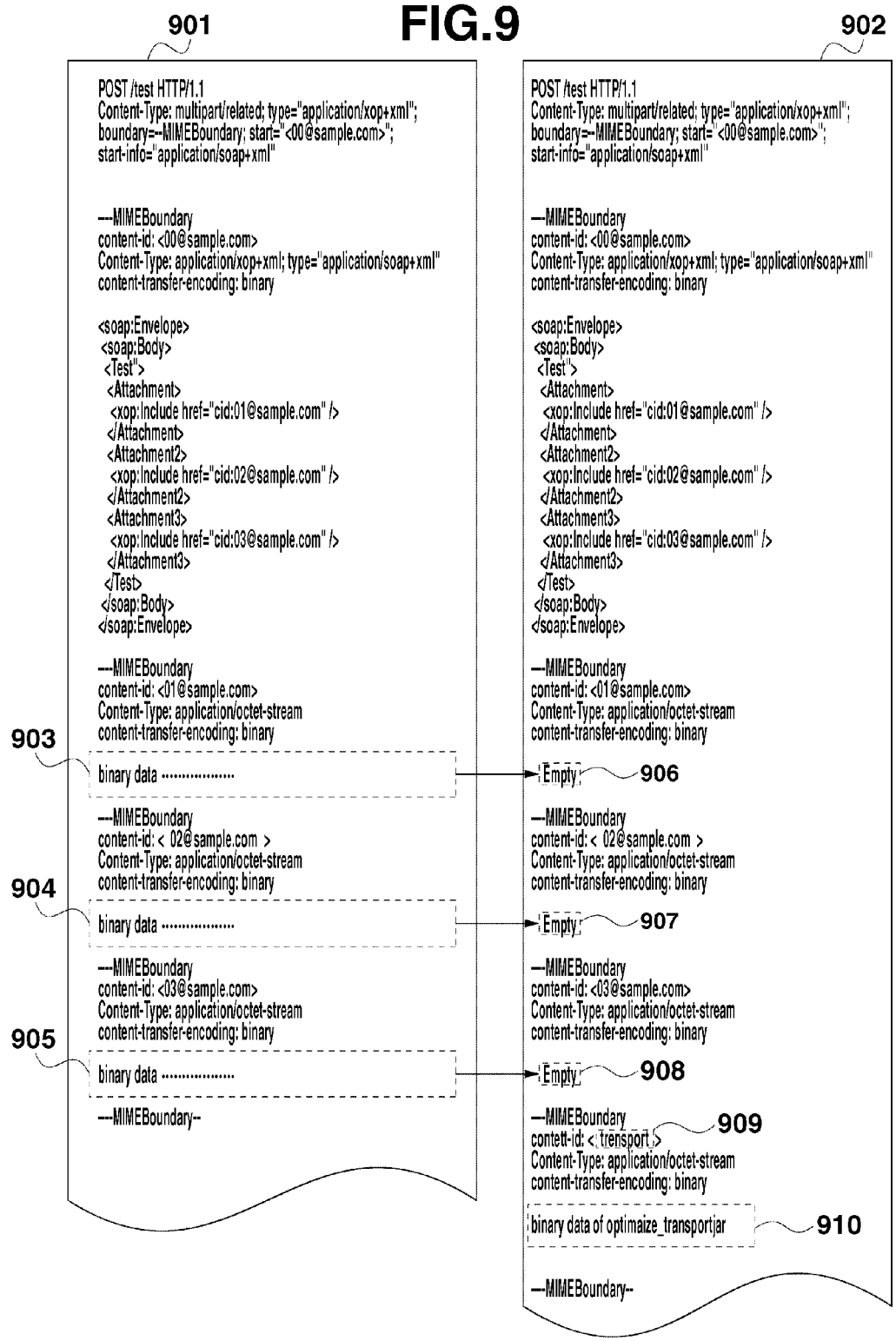
FIG. 9 is a diagram illustrating specific processing contents of a message regeneration unit.

FIG. 9 is a diagram illustrating contents of specific processing of the message regeneration unit 710 using the SOAP message. An SOAP message 901 with attachment data is similar to a general example of the SOAP message 301 with the attachment data shown in FIG. 3. The configuration of the SOAP message is described above with reference to FIG. 3, and the description is therefore omitted here. The message regeneration unit 710 separates the message and the attachment data, and newly adds the high-speed transport processing module to the message.

An SOAP message 902 is an example of the regenerated SOAP message. In the SOAP message 901, the attachment data is embedded as binary data to portions 903, 904, and 905. When the SOAP message is regenerated, the message regeneration unit 710 sets embedding portions 906, 907, and 908 of the binary data to "empty" indicating no embedding state. Further, the message regeneration unit 710 adds the high-speed transport processing module selected by the determination processing unit 708 to the last portion of the SOAP message.

More specifically, a value of Content-id as reference information used to refer to the attachment data is set as "transport" 909. Binary data 910 of an optimize_transport.jar file is embedded as the high-speed transport processing module. When the analysis processing unit 715 confirms the addition of the attachment data indicating that Content-id is the transport 909, the addition of the high-speed transport processing module can be recognized.

The message regeneration unit 710 regenerates the SOAP message as described above. The processing enables the transfer of the SOAP message and attachment data in different transports.

According to the second exemplary embodiment, as an example, the SOAP message and the attachment data are transferred in different transports. Alternatively, the transport used at the transfer time may be selected for each attachment data according to the size of the attachment data. In other words, when the size of the attachment data is smaller than the threshold, the attachment data is included in the message and is then transmitted. Further, when the size is larger than the threshold of the attachment data, the attachment data may be transferred in a transport different from the transport for transferring the message.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

Figure 10:
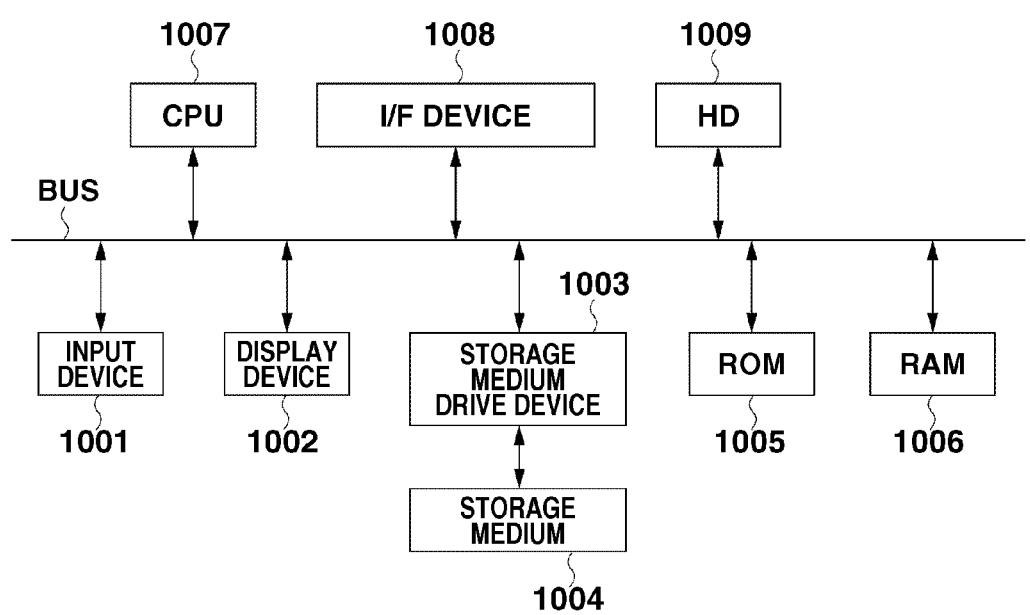
FIG. 10 is a hardware configuration diagram illustrating an example of a hardware configuration of an information processing apparatus.

FIG. 10 illustrates an example of a hardware configuration of an information processing apparatus that executes software for realizing the functions according to second exemplary embodiment. As illustrated in FIG. 10, the information processing apparatus includes the following constituent elements as the hardware configuration. Namely, the information processing apparatus includes an input device 1001, a display device 1002, a recording medium drive device 1003, a ROM 1005, a RAM 1006, and a CPU or MPU 1007. Further, the information processing apparatus includes an interface device 1008, and a hard disk (HD) 1009. The input device 1001 includes a keyboard and a mouse operated by an operator of the information processing apparatus, and is used to input various operation information to the information processing apparatus. The display device 1002 includes a display used by the operator of the information processing apparatus. The interface device 1008 connects the information processing apparatus to a network.

A storage medium 1004 such as a CD-ROM provides the program of the processing flow to the information processing apparatus, or the program is downloaded via the network. The storage medium 1004 is set to the recording medium drive device 1003, and the program is installed from the storage medium 1004 to the HD 1009 via the recording medium drive device 1003. The ROM 1005 stores a program that is first read upon turning on the information processing apparatus. The RAM 1006 is a main memory of the information processing apparatus. The CPU 1007 reads the program from the HD 1009, stores the read program to the RAM 1006, and executes the program, thereby realizing the processing contents of the reception procedure and the transmission procedure.

Figure 6:
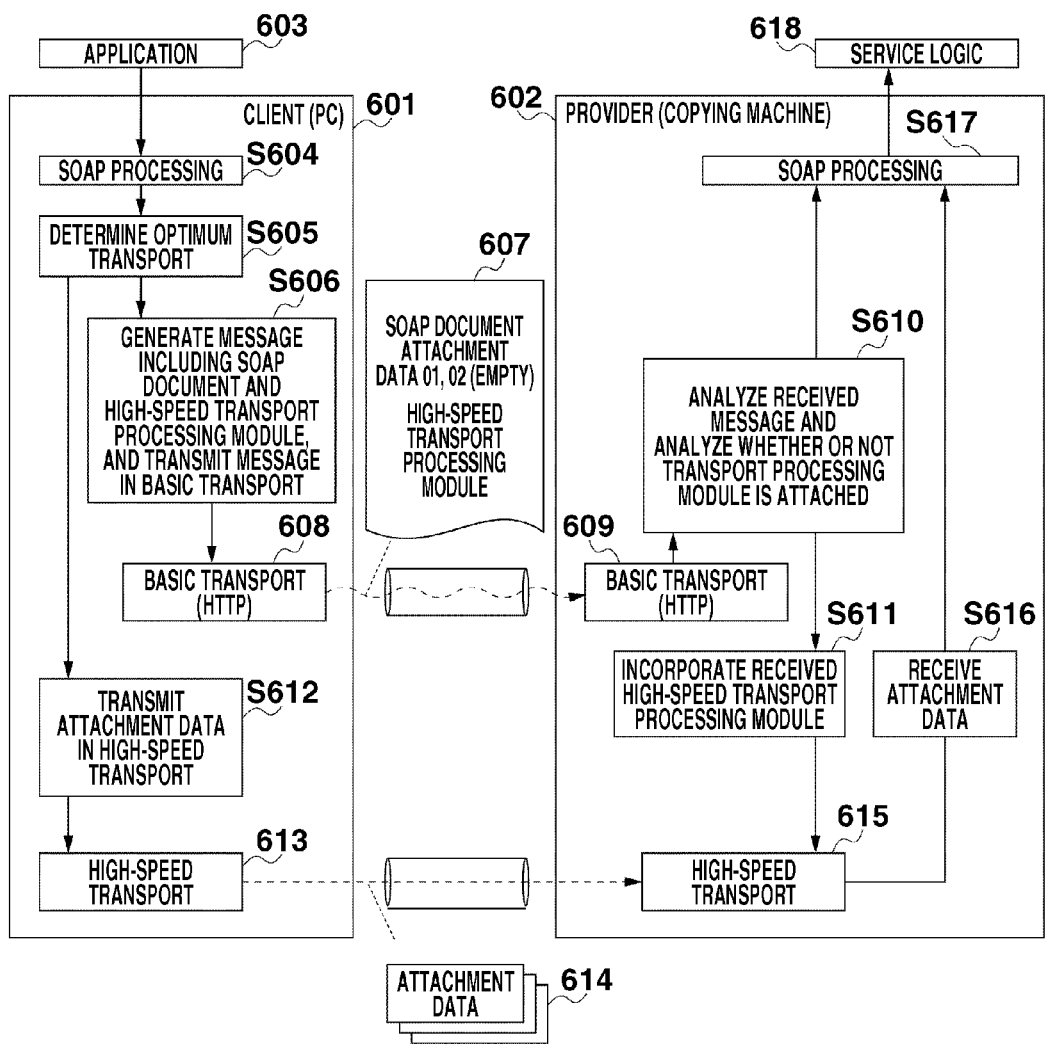
FIG. 6 is a diagram schematically illustrating processing in a message transmission and reception apparatus with transport switching.

The processing in FIGS. 1 and 6 illustrates a flow of the program stored in the HD 1009. Further, the processing units in FIG. 2 are software modules that are realized by reading the program from the HD 1009 and executing the read program by the CPU 1007. The storage area 206 is disposed in the RAM 1006. FIG. 7 is similar to FIGS. 1 and 6. FIGS. 4, 5, and 8 illustrate apart of the program stored in the HD 1009.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-160761 filed Jul. 7, 2009, which is hereby incorporated by reference herein in its entirety.

What is claimed is:

1. A transmission apparatus comprising:
a transmission unit configured to transmit a message, a data attachment is separated from the message and a processing module is added to the message, the message including the processing module is transmitted to a reception side by a first protocol, wherein the processing module is a program to be incorporated in the reception side for allowing the reception side to receive the data attachment by a second protocol on the reception side;
a generation unit configured to generate the data attachment that was separated from the message after being notified from the reception side that the processing module has been incorporated to the reception side and the reception side has been available to receive the data attachment by the second protocol; and
a control unit configured to control the transmission unit to transmit the generated data attachment to the reception side by the second protocol.

2. The transmission apparatus according to claim 1, wherein the transmission unit transmits a part of the message including an identifier of the remainder by the first protocol.

3. The transmission apparatus according to claim 1, wherein the transmission unit transmits the message to which the processing module is attached, including a part of the message.

4. The transmission apparatus according to claim 1, wherein the transmission unit determines whether the message is transmitted by using the second protocol in addition to the first protocol.

5. The transmission apparatus according to claim 1, wherein, when a volume of the message is more than a predetermined amount, the transmission unit transmits the message by using the second protocol in addition to the first protocol.

6. The transmission apparatus according to claim 1, wherein the transmission unit transmits data included in the message, by a protocol according to the data.

7. The transmission apparatus according to claim 1, wherein the control unit receives from the reception side a notification indicating that reception in the second protocol is possible on the reception side.

8. The transmission apparatus according to claim 1, wherein the transmission unit transmits a message in which a storage area for storing the remainder is empty, by the first protocol.

9. The transmission apparatus according to claim 1, wherein a part of the message is a structured document.

10. A transmission method executed by a transmission apparatus, the transmission method comprising:
    transmitting a message, a data attachment is separated from the message and a processing module is added to the message, the message including the processing module is transmitted to a reception side by a first protocol, wherein the processing module is a program to be incorporated in the reception side for allowing the reception side to receive the data attachment by a second protocol on the reception side;
    generating the data attachment that was deleted from the message after being notified from the reception side that the processing module has been incorporated to the reception side and the reception side has been available to receive the data attachment by the second protocol; and
    controlling the transmission to transmit the generated data attachment to the reception side by the second protocol.

11. The transmission method according to claim 10, wherein a part of the message and the processing module are transmitted as a message which includes the part and to which the processing module is added.

12. The transmission method according to claim 10, wherein data attached to the message is transmitted as the remainder, by the second protocol.

13. The transmission method according to claim 10, wherein it is determined whether the message is transmitted by using the second protocol in addition to the first protocol.

14. The transmission method according to claim 10, wherein a message indicating that a storage area for storing a remainder is empty is transmitted by the first protocol.

15. A non-transitory computer readable storage medium that stores a transmission program, the transmission program comprising:
    transmitting a message, a data attachment is separated from the message and a processing module is added to the message, the message including the processing module is transmitted to a reception side by a first protocol, wherein the processing module is a program to be incorporated in the reception side for allowing the reception side to receive the data attachment by a second protocol on the reception side;
    generating the data attachment that was deleted from the message after being notified from the reception side that the processing module has been added to the reception side and the reception side has been available to receive the data attachment by the second protocol; and
    controlling the transmission to transmit the generated data attachment to the reception side by the second protocol.

16. The non-transitory computer readable storage medium according to claim 15, wherein a message which includes a part of the message and to which the processing module is attached, is transmitted.

17. A communication method executed by a transmission apparatus and a reception apparatus, the communication method comprising:
    transmitting a message, a data attachment is separated from the message and a processing module is added to the message, the message including the processing module is transmitted to a reception side by a first protocol, wherein the processing module is a program to be incorporated in the reception side for allowing the reception side to receive the data attachment by a second protocol on the reception side;
    generating the data attachment that was deleted from the message after being notified from the reception side that the processing module has been incorporated to the reception side and the reception side has been available to receive the data attachment by the second protocol; and
    controlling the transmission of the transmission apparatus to transmit the generated data attachment to the reception apparatus by the second protocol.

18. The communication method according to claim 17, wherein the reception apparatus identifies data which is included in a remainder and corresponds to an identifier included in the part.

19. The communication method according to claim 17, wherein the processing module which allows the reception apparatus to receive a remainder by the second protocol is deleted from the reception apparatus after the remainder of the message is received by the second protocol.

20. A reception apparatus comprising:
    a reception unit configured to receive a message, a data attachment is separated from the message and a processing module is added to the message, by a first protocol, the message including the processing module and the processing module which allows the reception unit to receive data attachment by a second protocol, and further receive the data attachment by the second protocol;
    a notification unit configured to notify transmission side that the processing module has been incorporated to the reception side and the reception side has been able to receive the data attachment by the second protocol; and
    an identifying unit configured to identify data attachment, received by the second protocol, corresponding to an identifier included in the message received by the first protocol.

21. The reception apparatus according to claim 20, wherein the identifying unit identifies data corresponding to the identifier, as data to be attached to the message.

22. A reception method executed by a reception apparatus, the reception method comprising:
    receiving a message, a data attachment is separated from the message and a processing module is added to the message, by a first protocol, the message including the processing module is transmitted to a reception side by a first protocol and the data attachment by a second protocol;
    notifying transmission side that the processing module has been incorporated to the reception side and the reception side has been able to receive the data attachment by the second protocol;
    capturing from the message a processing module for receiving the data by the second protocol; and
    identifying data attachment, received by the second protocol, corresponding to an identifier included in the message received by the first protocol.

23. The reception method according to claim 22, wherein the data corresponding to the identifier is identified as data to be attached to the message.

24. A non-transitory computer readable storage medium that stores a reception program, the reception program comprising:
    receiving a message, a data attachment is separated from the message and a processing module is added to the message, by a first protocol, the message including the processing module is transmitted to a reception side by a first protocol and the data attachment by a second protocol;

notifying transmission side that the processing module has been incorporated to the reception side and the reception side has been able to receive the data attachment by the second protocol;

capturing from the message a processing module for receiving the data by the second protocol; and identifying data attachment, received by the second protocol, corresponding to an identifier included in the message received by the first protocol.

* * * * *